United States Patent
Lv et al.

(10) Patent No.: US 11,376,596 B2
(45) Date of Patent: Jul. 5, 2022

(54) MICROFLUIDIC CHIP, TESTING APPARATUS AND CONTROL METHOD THEREFOR

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Mingyang Lv, Beijing (CN); Yue Li, Beijing (CN); Jinyu Li, Beijing (CN); Yanchen Li, Beijing (CN); Dawei Feng, Beijing (CN); Dong Wang, Beijing (CN); Yu Zhao, Beijing (CN); Shaojun Hou, Beijing (CN); Wang Guo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 218 days.

(21) Appl. No.: 16/483,437

(22) PCT Filed: Dec. 25, 2018

(86) PCT No.: PCT/CN2018/123461
§ 371 (c)(1),
(2) Date: Aug. 5, 2019

(87) PCT Pub. No.: WO2019/134559
PCT Pub. Date: Jul. 11, 2019

(65) Prior Publication Data
US 2019/0351418 A1    Nov. 21, 2019

(30) Foreign Application Priority Data

Jan. 2, 2018  (CN) .......................... 201810003124.3

(51) Int. Cl.
*B01L 3/00* (2006.01)
*G01N 15/10* (2006.01)

(52) U.S. Cl.
CPC ..... *B01L 3/502784* (2013.01); *B01L 3/50273* (2013.01); *G01N 15/1031* (2013.01);
(Continued)

(58) Field of Classification Search
CPC .......... B01L 3/502784; B01L 3/50273; B01L 2200/0673; B01L 2300/161;
(Continued)

(56) References Cited

U.S. PATENT DOCUMENTS

2005/0115836 A1   6/2005 Reihs
2016/0116438 A1*  4/2016 Pamula ............ G01N 27/44791
                                                      204/454

(Continued)

OTHER PUBLICATIONS

1st Office Action dated Oct. 30, 2019 in CN201810003124.3.
International Search Report and Written Opinion dated Apr. 1, 2019 in PCT/CN2018/123461.

*Primary Examiner* — Jennifer Wecker
*Assistant Examiner* — Oyeleye Alexander Alabi
(74) *Attorney, Agent, or Firm* — Syncoda LLC; Feng Ma

(57) ABSTRACT

A microfluidic chip configured to move a microdroplet along a predetermined path, includes a plurality of probe electrode groups spaced apart along the predetermined path. Each of the plurality of probe electrode groups includes a first probe electrode and a second probe electrode spaced apart from each other. The first probe electrode and the second probe electrode among a plurality of first probe electrodes and a plurality of second probe electrodes are configured to form an electrical loop with the microdroplet to thereby facilitate determining a position of the microdroplet.

19 Claims, 10 Drawing Sheets

Flow direction

(52) U.S. Cl.
CPC .. *G01N 15/1056* (2013.01); *B01L 2200/0673* (2013.01); *B01L 2300/161* (2013.01); *B01L 2400/0415* (2013.01)

(58) Field of Classification Search
CPC ..... B01L 2400/0415; B01L 2300/0645; B01L 2300/0816; B01L 2400/0427; B01L 3/502792; B01L 3/5027; B01L 2200/143; G01N 15/1031; G01N 15/1056
See application file for complete search history.

(56) References Cited

U.S. PATENT DOCUMENTS

2019/0105655 A1    4/2019  Dong et al.
2019/0366333 A1*  12/2019  Zhou ................. B01L 3/502792

* cited by examiner

Flow direction

Flow direction

Flow direction

Flow direction

Flow direction

Flow direction

MICROFLUIDIC CHIP, TESTING APPARATUS AND CONTROL METHOD THEREFOR

CROSS-REFERENCE TO RELATED APPLICATION

The present application claims priority to Chinese Patent Application No. 201810003124.3 filed on Jan. 2, 2018, the disclosure of which is hereby incorporated by reference in its entirety.

TECHNICAL FIELD

The present disclosure relates to the field of microfluidic technology, and more specifically, to a microfluidic chip, a testing apparatus, and a control method of a microfluidic chip.

BACKGROUND

Electrowetting digital microfluidics enables separation, orientation, and mixing of microdroplets by controlling voltage of the electrodes by means of a dielectric wetting effect. In this method, the flatness of the hydrophobic layer in direct contact with the microdroplets is very important, directly affecting the transport of the microdroplets. For example, dust, or the surface roughness being too large, etc., may affect the flatness of the chip surface, resulting in the microdroplets not being transported according to a predetermined timing, resulting in failure of the reaction.

SUMMARY

In an aspect, a microfluidic chip is provided. The microfluidic chip can be configured to move a microdroplet along a predetermined path. A plurality of probe electrode groups are included in the microfluidic chip, and are spaced apart along the predetermined path. Each of the plurality of probe electrode groups includes a first probe electrode and a second probe electrode spaced apart from each other. The first probe electrode and the second probe electrode among a plurality of first probe electrodes and a plurality of second probe electrodes are configured to form an electrical loop with the microdroplet to thereby facilitate determining a position of the microdroplet.

In some embodiments, two adjacent probe electrode groups among the plurality of probe electrode groups share one second probe electrode or one first probe electrodes.

In some embodiments, a distance between two adjacent probe electrodes groups is greater than a size of the microdroplet along the predetermined path to thereby facilitate accurately determining the position of the microdroplet.

In some embodiments, the plurality of the first probe electrodes are electrically coupled to each other; or the plurality of the second probe electrodes are electrically coupled to each other.

In some embodiments, the first probe electrode and the second probe electrode each have a thickness of 400 nm or less.

In some embodiments, the microfluidic chip further includes a first plate, wherein the plurality of probe electrode groups are disposed on a first surface of the first plate configured to be in contact with the microdroplet.

In some embodiments, the first plate includes a plurality of drive electrodes spaced apart along the predetermined path; and each of the plurality of drive electrodes has an orthographic projection on the first surface covering an orthographic projection of at least one probe electrode group on the first surface.

In some embodiments, the microfluidic chip further includes a first plate and a second plate opposing each other, wherein: the plurality of probe electrode groups are disposed over at least one of a first surface of the first plate configured to be in contact with the microdroplet, or a second surface of the second plate configured to be in contact with the microdroplet.

In some embodiments, the first plate and/or the second plate include a plurality of drive electrodes spaced apart along the predetermined path; an orthographic projection of each of the plurality of drive electrodes on the first surface covers an orthographic projection of at least one probe electrode group on the first surface.

In some embodiments, for each of the plurality of drive electrodes, an orthographic projection of at least one of the plurality of probe electrode groups on the drive electrode is located at a position biased toward a forward flow direction of the microdroplet from a center position of the drive electrode.

In some embodiments, the microfluidic chip further includes a controller configured to perform an automatic positioning-feedback-adjusting control loop of the microdroplet.

In some embodiments, at least one other of the plurality of probe electrode groups is configured to form an open circuit without contacting the microdroplet.

In some embodiments, the first probe electrodes and the second probe electrodes are composed of at least one of ITO (Indium-Tin Oxide), AZO (Aluminum-doped Zinc Oxide), or FTO (Fluorine-doped Tin Oxide), having a rectangular shape with a width of about 100 μm and a length of about 1 cm; at least one of the first plate or the second plate comprises a substrate composed of glass, a dielectric layer composed of at least one of $SiO_2$, Perylene, or $Ta_2O_5$ and disposed over a surface of the substrate, and a hydrophobic layer disposed over the dielectric layer at a surface distal from the substrate; the plurality of probe electrode groups are disposed at a surface of the hydrophobic layer distal from the substrate; and the first probe electrode and the second probe electrode in each of the plurality of probe electrode groups are arranged along the predetermined path, or spaced in a direction perpendicular to the predetermined path.

In some embodiments, the plurality of probe electrode groups form an array; and the predetermined path is determined by selecting probe electrode groups from the array.

In some embodiments, the array is three dimensional.

In another aspect, a testing apparatus is provided, including the microfluidic chip described above; and a power supply configured to supply a voltage between the first probe electrode and the second probe electrode of less than or equal to 5 V.

In some embodiments, the testing apparatus further includes a sampling device configured to analyze the microdroplet that flows along the predetermined path in a forward flow direction.

In another aspect, a method of controlling the microfluidic chip is provided, the method includes: controlling the microdroplet to flow in a flow direction; detecting whether one of the plurality of probe electrode groups has an electrical current flowing therethrough; determining a position corresponding to the probe electrode group having the electrical current flowing therethrough as a present position of the microdroplet; comparing the present position with the predetermined path; and upon the present position deviating from the predetermined path, adjusting the flow direction of the microdroplet such that the microdroplet flows along the predetermined path.

In some embodiments, the method further includes: recording a stay time of the microdroplet at the present position; comparing the stay time with a preset time; and upon the stay time exceeding the preset time, adjusting a drive force for the microdroplet, such that the microdroplet flows along the predetermined path.

In some embodiments, the method further includes: recording a stay time of the microdroplet at the present position; comparing the stay time with a preset time; and upon the stay time exceeding the preset time, adjusting a drive force for the microdroplet, such that the microdroplet flows along an alternate predetermined path.

Other embodiments and implementations can become apparent in view of the following descriptions and drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

Figure 1:
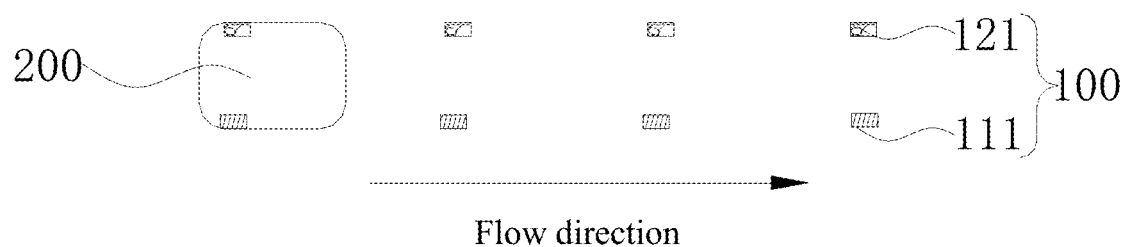
FIG. 1 is a schematic view showing the planar structure of a probe electrode group according to an embodiment of the present disclosure.

In the drawings:
100, 100', 101, 102, 103: probe electrode group; 110: first common electrode; 111, 111': first probe electrode; 120: second common electrode; 121, 121': second probe electrode; 200: microdroplet; 300: first plate; 310: first surface; 320: first substrate; 330: first dielectric layer; 340: first hydrophobic layer; 400: second plate; 410: second surface; 420: second substrate; 430: second dielectric layer; 440: second hydrophobic; layer 500: drive electrode; 1500: controller; 1600: power supply; 1700: read out device; 1702: microfluidic chip; 1750: sampling device; 1800: testing apparatus; 1802: first predetermined path; 1804: second predetermined path.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those of ordinary skill in the art can obtain other embodiment(s), which come(s) within the scope sought for protection by the disclosure.

Embodiments of the present disclosure are described in detail below. The embodiments described below are illustrative only and are not to be construed as limiting the disclosure. Where specific techniques or conditions are not indicated in the examples, they are carried out according to the techniques or conditions described in the literature in the art or in accordance with the product specifications. Any reagents or instruments that are not indicated by the manufacturer are commercially available products.

The inventors of the present disclosure have recognized that, in order to realize automatic and accurate transportation of microdroplets, it may be needed to detect the positions of microdroplets in real time. At present, the visual feedback system is commonly employed, which relies on expensive camera equipment, with an overall high cost, and the amount of data to be processed is huge.

Some embodiments of the present disclosure can solve at least one of the technical problems in the related art to, for example by providing a real-time positioning of microdroplets, with a low cost, and high-level of integration and miniaturization. Interference from the environment and microdroplet biochemical reactions can be reduced during the microdroplet transfer and testing. Computational data volume can be reduced, and reliability can be improved.

In an aspect, a microfluidic chip is provided. According to some embodiments of the present disclosure, referring to FIG. 1 through FIG. 3, the microfluidic chip can include a plurality of probe electrode groups 100.

In some embodiments, the plurality of electrode groups 100 are spaced apart along a predetermined path of a microdroplet 200. Although an arrow indicating a "flow direction" is illustrated in the drawings, those of ordinary skill in the art will recognize that the flow direction does not necessarily follow a straight line. For example, the predetermined flow path can be curved, such as curved as an "S" shape, zig-zagged, or have any shapes.

In some other embodiments, the plurality of electrode groups 100 are configured as an array over the microfluidic chip, and the predetermined path can be formed by selected electrode groups 100, as described in more detail below. In some embodiments, the predetermined path can be a microchannel formed over the microfluidic chip.

Each of the probe electrode groups 100 includes a first probe electrode 111 and a second probe electrode 121 spaced apart from each other. The first probe electrode 111 and the second probe electrode 121 can be configured to form a loop with the microdroplet 200 to determine a location of the microdroplets 200.

The microfluidic chip according to embodiments of the present disclosure can realize real-time positioning of the microdroplet 200, at a low cost, and can facilitate integration and miniaturization. By employing electrical current feedback, interference of the biochemical reaction between the environment and the microdroplet 200 can be reduced or avoided. In addition, using only the electrical current as a basis for the presence or absence of the microdroplet 200 can reduce the amount of computation data, and increase reliability. The applied voltage is low, and does not affect the driving of the microdroplet 200.

According to some embodiments of the present disclosure, the specific setting positions of the plurality of probe electrode groups are not particularly limited as long as they can form a loop with the micro droplets, and those of ordinary skill in the art can flexibly select according to needs, for example, but not limited to, being disposed on the microfluidic chip.

The probe electrode group can be placed at a suitable position on other structures and components, or be fixed with additional structural components. In some embodiments of the present disclosure, one probe electrode may be shared between two adjacent probe electrode groups; in other embodiments of the present disclosure, a plurality of probe electrode groups may be disposed with specific intervals along a predetermined path of microdroplet flow.

Therefore, when the microdroplet flows to a certain position, the probe electrode group corresponding to the position can be turned on, and when the probe electrode group detects that an electrical current flows therethrough, the position corresponding to the probe electrode group is the position of the microdroplet.

Figure 4:
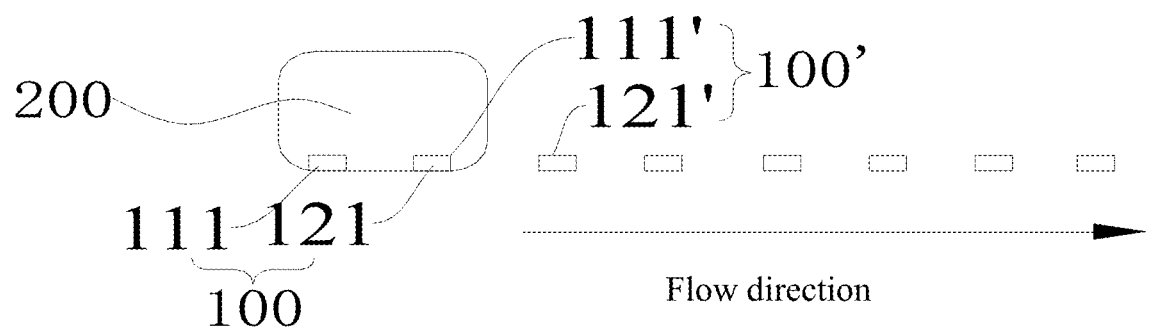
FIG. 4 is a view showing the planar structure of a probe electrode group according to yet another embodiment of the present disclosure.
Figure 5:
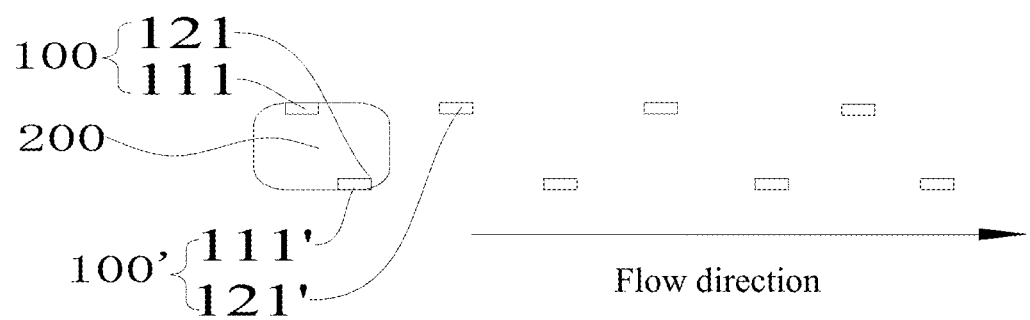
FIG. 5 is a view showing the planar structure of a probe electrode group according to yet another embodiment of the present disclosure.

According to some embodiments of the present disclosure, referring to FIG. 4 and FIG. 5, one probe electrode may be shared between two adjacent probe electrode groups. For example, among the two adjacent probe electrodes groups 100 and 100', a second probe electrode 121 of the probe electrode group 100 is also a first probe electrode 111' of the other probe electrode group 100'.

In this case, a distance between the first probe electrode and the second probe electrode in each probe electrode group should be no greater than a width of the microdroplet 200 in the flow direction of the microdroplet 200. With such a setting, the electrode can have a high electrical current density, leading to a high detection sensitivity.

According to some embodiments of the present disclosure, when a plurality of probe electrode groups are disposed with specified intervals along a predetermined path of the microdroplets flow, among the plurality of probe electrode groups 100, between the adjacent two probe electrodes groups 100 the distance is not particularly limited, and those of ordinary skill in the art can flexibly select as needed as long as the requirements are met. In some embodiments of the disclosure, the distance between adjacent two probe electrode groups 100 is greater than the width of the microdroplet 200 in the direction of flow of the microdroplets 200. As such, the microdroplet 200 can be prevented from being simultaneously turned on with the two probe electrode groups 100, which can affect the accuracy of positioning.

According to some embodiments of the present disclosure, the interval between the plurality of probe electrode groups 100 is not particularly limited, and a person of ordinary skill in the art can flexibly select as needed as long as the requirements are met. For example, the plurality of probe electrode groups 100 can be disposed at equal distances, or non-equal distances, so long as the accuracy of the positioning of the microdroplet 200 is not affected.

According to some embodiments of the present disclosure, the specific arrangement positions of the first probe electrode 111 and the second probe electrode 121 in each of the probe electrode groups 100 are not particularly limited so long as the microdroplets can flow and can form an electrical current loop with the probe electrode groups 100 to thereby determine the positions of the microdroplets.

For example, the first probe electrode 111 and the second probe electrode 121 can be in contact with the same microdroplet when the microdroplets flow through. Those of ordinary skill in the art can modify or select the configurations as needed, for example, including but not limited to, along the flow direction of the microdroplets (see FIG. 2 for a schematic view of the structure), or along a direction perpendicular to the microdroplet flow direction (see FIG. 1 for a schematic view of the structure).

Figure 3:
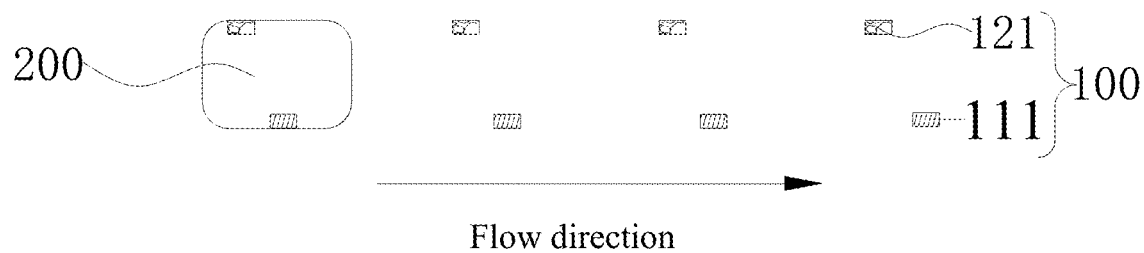
FIG. 3 is a view showing the planar structure of a probe electrode group according to yet another embodiment of the present disclosure.

Whether along the flow direction of the microdroplets, or in a direction vertical to the flow direction of the microdroplets, the first probe electrode 111 and the second probe electrode 121 can be facing each other (see FIG. 1 for a schematic structural view), or can be staggered (see FIG. 3 for a schematic structural view).

In some embodiments of the present disclosure, in order to improve microdroplet positioning accuracy, facilitate preparation, or for other considerations, the first probe electrode 111 and the second probe electrode 121 in each of the probe electrode groups 100 can be spaced apart along the microfluid flow direction.

Figure 2:
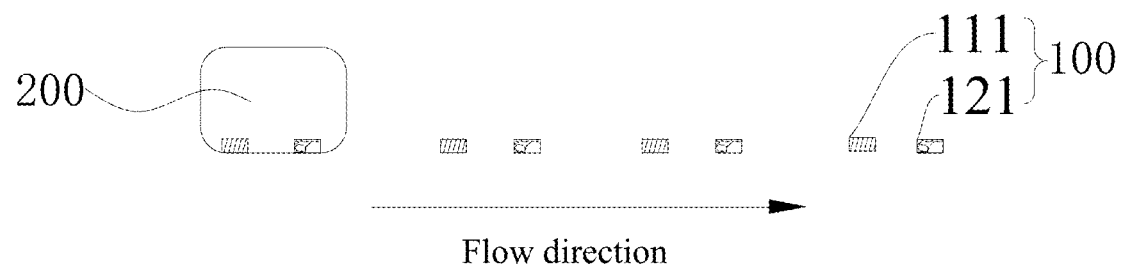
FIG. 2 is a schematic view showing the planar structure of a probe electrode group according to another embodiment of the present disclosure.

In some embodiments; the first probe electrode 111 and the second probe electrode 121 in each of the probe electrode groups 100 can also be spaced apart in a direction perpendicular to the flow direction of the microdroplets, and may be located at the same cross-sectional plane of the flow (see FIG. 1 for a schematic diagram of the structure). Therefore, the accuracy of the microdroplet positioning can be further improved, and the preparation of the probe electrodes can be facilitated. In this case, as the first probe electrode 111 and the second probe electrode 121 are located in the same cross-sectional plane of the flow to prevent the microdroplet 200 from not contacting the first probe electrode 111 and the second probe electrode 121 at the same time, resulting in open circuit, or an overly small electrical current in the case of a not-well-formed closed circuit.

According to some embodiments of the present disclosure, specific materials for forming the first probe electrode 111 and the second probe electrode 121 are not particularly limited, and those of ordinary skill in the art can flexibly select the materials according to needs as long as certain requirements are met. For materials for making the first probe electrode 111 and the second probe electrode 121 can be, for example, but not limited to, ITO (Indium-Tin Oxide), AZO (Aluminum-doped Zinc Oxide), FTO (Fluorine-doped Tin Oxide), etc.

In some embodiments of the present disclosure, the specific material of the first probe electrode 111 and the second probe electrode 121 can be ITO. As such, the first probe electrode 111 and the second probe electrode 121 can be made to have good electrical conductivity and transparency.

According to some embodiments of the present disclosure, the shapes of the first probe electrode 111 and the second probe electrode 121 are not particularly limited, and those of ordinary skill in the art can flexibly select their shapes as needed, so long as certain requirements are met. In some embodiments of the present disclosure, the first probe electrode 111 and the second probe electrode 121 can have a stripe shape, or have a shape of an elongated rectangle. Therefore, the influence of the first probe electrode 111 and the second probe electrode 121 on the flow of the microdroplet 200 can be minimized.

According to some embodiments of the present disclosure, thicknesses of the first probe electrode 111 and the second probe electrode 121 are not particularly limited, and those of ordinary skill in the art can flexibly select the electrode thicknesses as needed, so long as certain requirements are met. In some embodiments of the present disclosure, a thickness of the first probe electrode 111 and the second probe electrode 121 can be 400 nm or less, for example, 400 nm, 350 nm, 300 nm, etc. Therefore, the influence of the first probe electrode 111 and the second probe electrode 121 on the flow of the microdroplet 200 can be minimized.

According to some embodiments of the present disclosure, the areas of the first probe electrode 111 and the second probe electrode 121 are not particularly limited, and those of ordinary skill in the art can flexibly select their areas as needed, so long as certain requirements are met. In some embodiments of the present disclosure, an area of the first probe electrode 111 and the second probe electrode 121 can be 100 mm$^2$ or less, for example, 100 mm$^2$, 50 mm$^2$, 10 mm$^2$, 1 mm$^2$, etc. In order to minimize the influence of the probe electrode groups on the flow of the microdroplets, the first probe electrode 111 and the second probe electrode 121 according to some embodiments of the present disclosure can have a rectangular shape with a width of 100 μm and a length of 1 cm. As such, the influence of the first probe electrode 111 and the second probe electrode 121 on the flow of the microdroplet 200 can be minimized.

According to some embodiments of the present disclosure, a voltage between the first probe electrode 111 and the second probe electrode 121 is not particularly limited, and a person of ordinary skill in the art can flexibly select the voltage as needed, so long as certain requirements are met. In some embodiments of the present disclosure, the voltage between the first probe electrode 111 and the second probe electrode 121 is less than or equal to 5 V, and can be, for example, 5 V, 4 V, 3 V, 2 V, 1 V, 100 mV, 10 mV, etc. Of course, in order to ensure the accuracy of the detection, it may be necessary to ensure that the current flowing through the probe electrode group can be detected. Therefore, it is preferable that the voltage between the first probe electrode 111 and the second probe electrode 121 is not less than 10 mV, and the current flowing through the probe electrode group is preferably not less than 25 microamperes. As such, the position of the microdroplet can be effectively determined, and the voltage between the first probe electrode 111 and the second probe electrode 121 can be prevented from being excessively affecting the flow of the microdroplet 200 from a higher voltage.

According to some embodiments of the present disclosure, when a plurality of probe electrode groups are used for positioning microdroplets, so long as each electrode group can correspond to one position, it may be sufficient for the apparatus to perform positioning. Therefore, among the plurality probe electrode groups, it may be sufficient to have just one of the plurality of first probe electrodes or the plurality of second probe electrodes distinguish different positional information.

For example, in some embodiments of the present disclosure, the plurality of first probe electrodes 111 can be electrically coupled to each other; alternatively, the plurality of second probe electrodes 121 can be electrically coupled to each other. The specific manners of electrically coupling the probe electrodes are not particularly limited.

In an example, the plurality of first probe electrodes 111, or the plurality of second probe electrodes 121, may be replaced by one common electrode. In another example, the plurality of first probe electrodes 111 may be connected by wires or the like. In yet another example, the plurality of second probe electrodes 121 are electrically coupled to each other.

Figure 6:
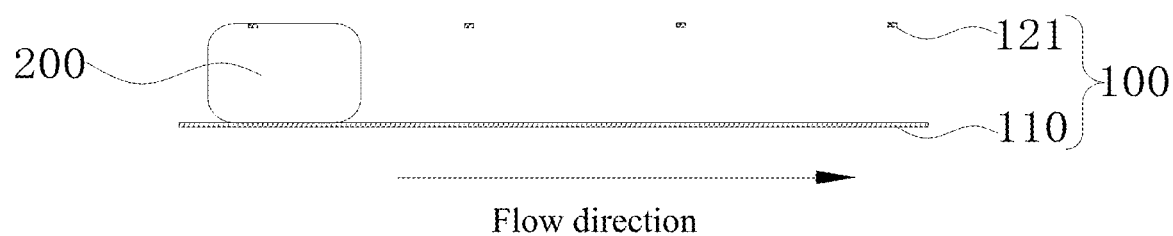
FIG. 6 is a view showing the planar structure of a probe electrode group according to yet another embodiment of the present disclosure.
Figure 7:
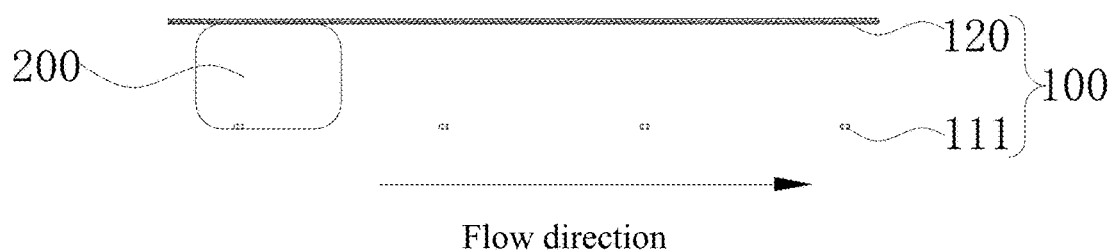
FIG. 7 is a view showing the planar structure of a probe electrode group according to yet another embodiment of the present disclosure.

Referring to FIG. 6 for an example, and the plurality of first probe electrodes 111 are configured together to form a first common electrode 110. Referring to FIG. 7 for another example, a plurality of the second probe electrodes 121 jointly form a second common electrode 120. When the plurality of the first probe electrodes 111 or the plurality of the second probe electrodes 121 are electrically coupled, only one common electrode is needed, and it is not necessary to separately form a plurality of first probe electrodes or second probe electrodes. As such, the whole microfluidic chip manufacturing process is simpler, more convenient, and the cost is lower.

According to some embodiments of the present disclosure, the specific type of the microfluidic chip is not particularly limited, and can be flexibly selected by those of ordinary skill in the art as needed. For example, the microfluidic chip can be a unipolar plate microfluidic chip, a bipolar plate microfluidic chip, etc.

Figure 8:
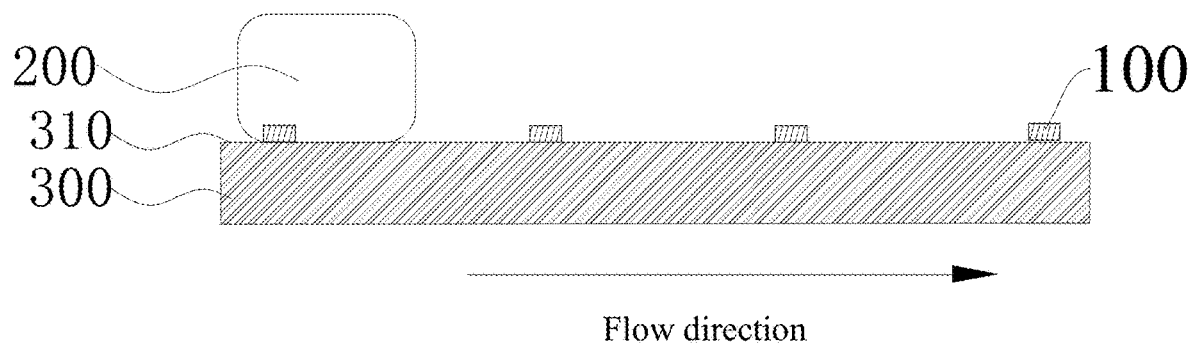
FIG. 8 is a cross-sectional view showing the structure of a microfluidic chip according to an embodiment of the present disclosure.

In some embodiments of the present disclosure, the microfluidic chip can comprise a unipolar plate microfluidic chip which, with reference to FIG. 8, can include a first plate 300, and the probe electrode group 100 is disposed at a first surface 310 of the first plate 300, where the first surface 310 is in contact with the microdroplet 200.

According to some embodiments of the present disclosure, the specific structure of the first plate 300 is not particularly limited, and those of ordinary skill in the art can flexibly select the structure of the first plate 300 according to actual needs.

Figure 9:
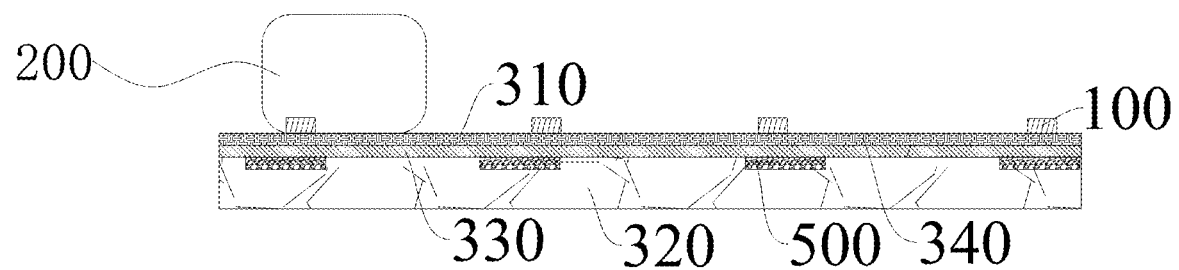
FIG. 9 is a cross-sectional structural view showing a microfluidic chip according to another embodiment of the present disclosure.

In some embodiments of the present disclosure, referring to FIG. 9, the first plate 300 includes a plurality of drive electrodes 500 spaced along the flow direction of the microdroplets 200 for driving the microdroplets to flow along a predetermined path.

According to some embodiments of the present disclosure, the specific shape, thickness, area, loading voltage, etc. of the drive electrode 500 are not particularly limited, so long as certain requirements for driving the microdroplets to flow along the predetermined path are satisfied.

According to some embodiments of the present disclosure, the specific materials for forming the drive electrode 500 are not particularly limited, so long as certain requirements are met. Those of ordinary skill in the art can flexibly select the materials to fabricate the drive electrode 500 according to needs. Such materials may include, for example, ITO (Indium Tin Oxide), AZO (Aluminum-doped Zinc Oxide), FTO (Fluorine-doped Tin Oxide), etc. In some embodiments of the disclosure, the specific material of the drive electrode 500 may be ITO. As such, the drive electrode 500 can be made to have good electrical conductivity and transparency.

According to some embodiments of the present disclosure, the relative positional relationship between the drive electrode 500 and the probe electrode group 100 is not particularly limited, so long as certain requirements are met. Those of ordinary skill in the art can flexibly select the configuration of the drive electrode 500 and the probe electrode group 100 according to practical applications. For example, each of the driving electrodes 500 on the first surface 310 can have an orthographic projection that can cover an orthographic projection of at least one probe electrode group 100 on the first surface 310.

Figure 10:
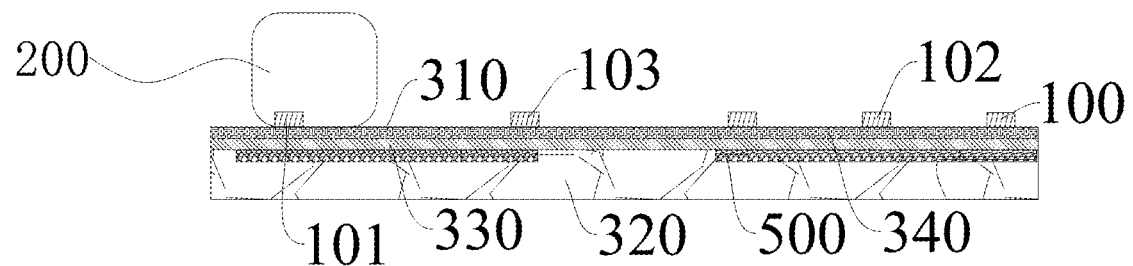
FIG. 10 is a cross-sectional view showing the structure of a microfluidic chip according to yet another embodiment of the present disclosure.

In an example, FIG. 10 shows a schematic structural view of an orthographic projection of a plurality of probe electrode groups 100 on the first surface 310 being covered by an orthographic projection of one drive electrode 500 on the first surface 310.

In another example, with reference to FIG. 9, an orthographic projection of only one probe electrode group 100 on the first surface 310 corresponds to an orthographic projection of one drive electrode 500 on the first surface 310, such as being covered by the orthographic projection of one drive electrode 500. In this case, the positioning may be more accurate. In addition, when the flow of the microdroplet 200 is detected to be blocked or deviated from the predetermined path, the movement state of the microdroplet 200 can be adjusted by adjusting the voltage of the drive electrode 500 in real time without delay, thereby ensuring the entire system function properly.

According to some embodiments of the present disclosure, for each of the drive electrodes 500, the position of the probe electrode group 100 being orthographically projected on the drive electrode 500 is not particularly limited, so long as certain requirements are met. Those of ordinary skill in the art can select the configurations of the drive electrodes 500 and the probe electrode group 100 flexibly according to actual applications.

For example, the orthographic projection of the probe electrode group 100 on the drive electrode 500 can be located at a position away from the center of the drive electrode 500 away from the flow direction of the microdroplet 200, such as the case for the probe electrode group 101 shown in FIG. 10.

In another example, an orthographic projection of the probe electrode group 100 on the drive electrode 500 can be located at a center position of the drive electrode 500, such as the case for the probe electrode group 102 as shown in FIG. 10.

In some embodiments of the present disclosure, at least one of the orthographic projections of the probe electrode groups 100 on the drive electrode 500 is located at a position where the center of the drive electrode 500 is biased toward the flow direction of the microdroplet 200, such as the case for the probe electrode group 103 in FIG. 9. In this case, the microdroplet 200 at this position has a largest height in the direction perpendicular to the flow direction of the microdroplet 200, and when the first probe electrode and the second probe electrode are spaced apart from each other in a direction perpendicular to the flow direction of the microdroplet, the first probe electrode 111 and the second probe electrode 121 can have a better chance of electrical coupling, thereby improving the detection sensitivity.

According to an embodiment of the present disclosure, referring to FIG. 9 and FIG. 10, the first plate 300 can further include a first substrate 320, a first dielectric layer 330 disposed over a surface of the first substrate 320, and a first hydrophobic layer 340 disposed over the first dielectric layer 330 at a surface distal from the first substrate 320.

Figure 11:
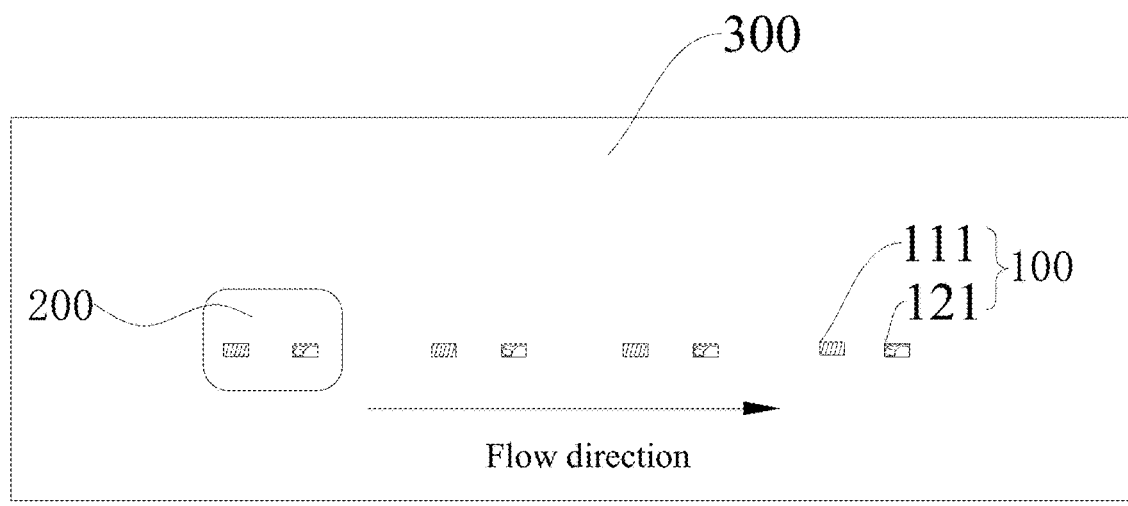
FIG. 11 is a schematic view showing the planar structure of a microfluidic chip according to yet another embodiment of the present disclosure.
Figure 12:
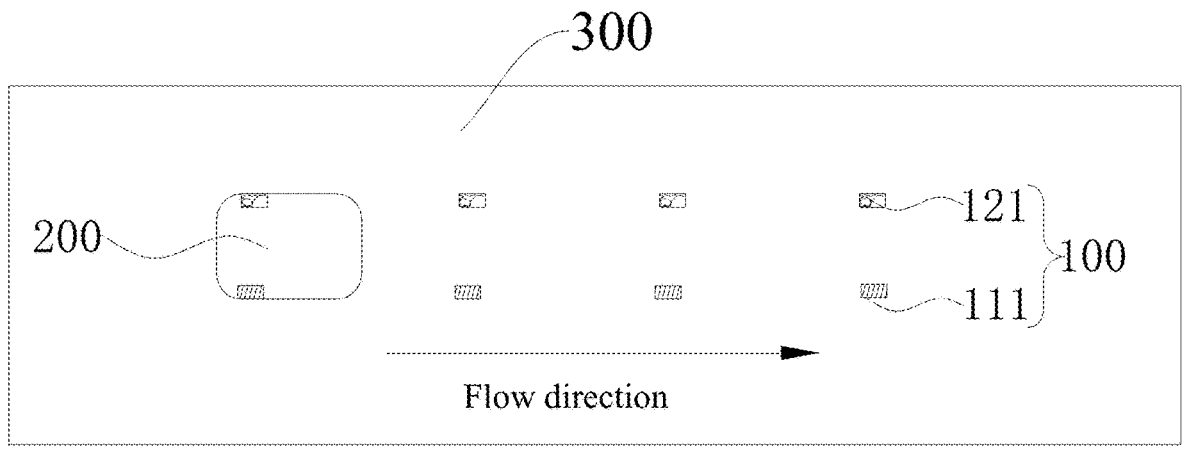
FIG. 12 is a view showing the planar structure of a microfluidic chip according to yet another embodiment of the present disclosure.

The probe electrode group 100 is disposed at a surface of the first hydrophobic layer 340 distal from the first substrate 320, e.g., the first surface 310 of the first plate 300. In some implementations, the first probe electrode 111 and the second probe electrode 121 in each probe electrode group can be arranged along the flow direction of the microdroplets, as illustrated in FIG. 11. Alternatively, the first probe electrode 111 and the second probe electrode 121 in each probe electrode group can be spaced in a direction perpendicular to the flow direction of the microdroplets 200, as illustrated in FIG. 12.

According to some embodiments of the present disclosure, the specific material types of the substrate, the dielectric layer, and the hydrophobic layer are not particularly limited, and those of ordinary skill in the art can flexibly select the materials as needed, so long as certain requirements are met.

In some embodiments, the substrate can be composed of glass; the dielectric layer can comprise one or more of $SiO_2$, Perylene (poly-p-xylene), $Ta_2O_5$, etc. In this configuration, direct contact between the microdroplets and the drive electrodes can be avoided, thereby preventing electrical current from passing through the microdroplets to cause electrolysis. In some embodiments; the hydrophobic layer may be composed of Teflon, thereby facilitating the control of the microdroplets.

According to some embodiments of the disclosure, the microfluidic chip can also be a bipolar plate microfluidic chip. The following is a detailed description of a specific structure of the microfluidic chip using a bipolar plate digital microfluidic chip as an example.

Figure 13:
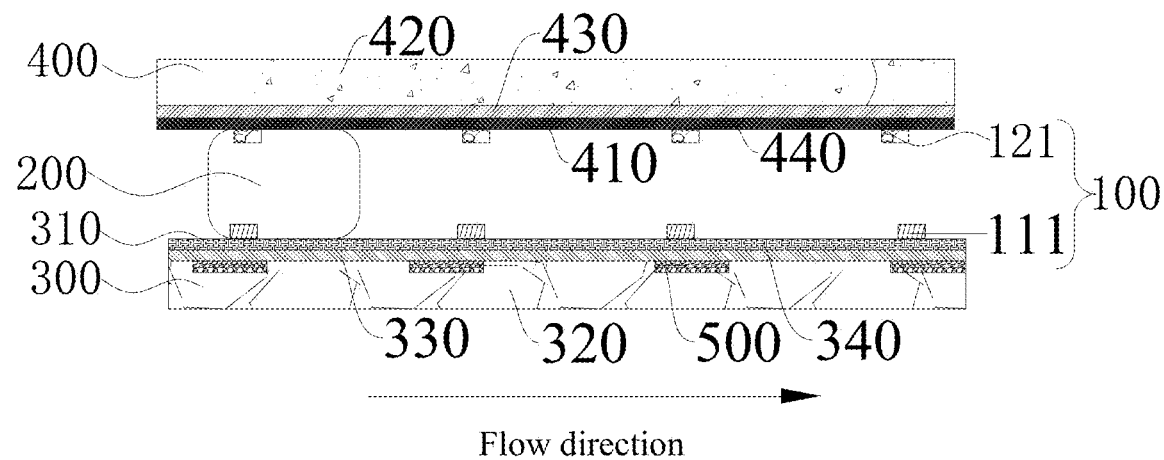
FIG. 13 is a cross-sectional view showing the structure of a microfluidic chip according to yet another embodiment of the present disclosure.

According to some embodiments of the present disclosure, referring to FIG. 13, the microfluidic chip may include a first plate 300 and a second plate 400 opposed to each other, and the probe electrode group 100 is disposed over at least one of the first plate 300 at the first surface 310 in contact with the microdroplet 200, or the second plate 300 at the second surface 420 in contact with the microdroplet 200.

According to some embodiments of the present disclosure, the specific structures of the first plate 300 and the second plate 400 are not particularly limited, and those of ordinary skill in the art can flexibly select the structures according to practical needs. In some embodiments of the present disclosure, the structure of the first plate 300 is consistent with the foregoing description, and details are not repeated herein.

Referring to FIG. 13, the second plate 400 may include a second substrate 420, a second dielectric layer 430 located on the second substrate 420 at a surface proximal to the first plate, and a second hydrophobic layer 440 disposed over the second dielectric layer 430 at a surface proximal to the first plate 300.

Figure 14:
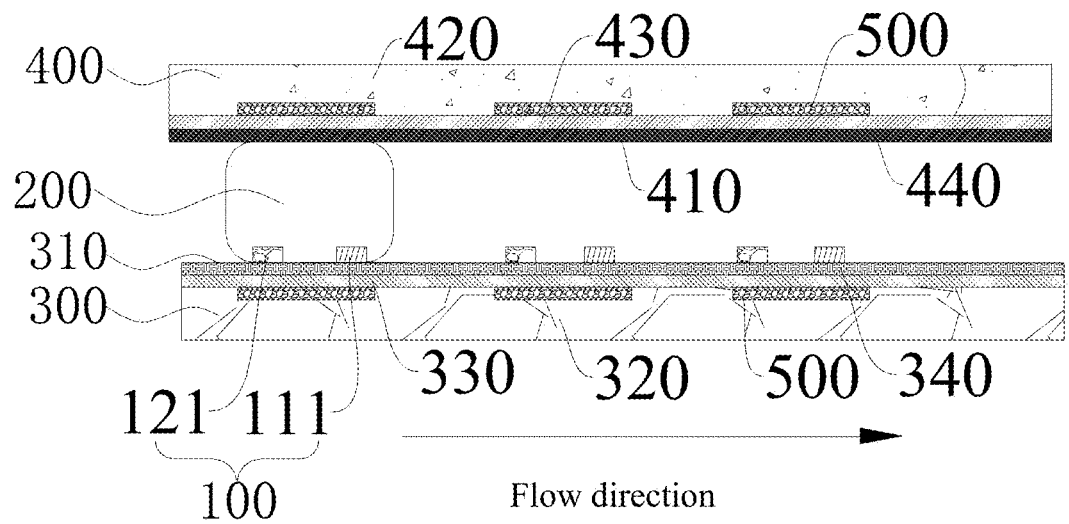
FIG. 14 is a cross-sectional view showing the structure of a microfluidic chip according to yet another embodiment of the present disclosure.

In some embodiments of the present disclosure, with reference to FIG. 14, The electrode plate 400 may further include a plurality of spaced-apart drive electrodes 500 configured to drive the flow of the microdroplets. These drive electrodes can be similar to those described above with respect to the first electrode plate 300.

Figure 15:
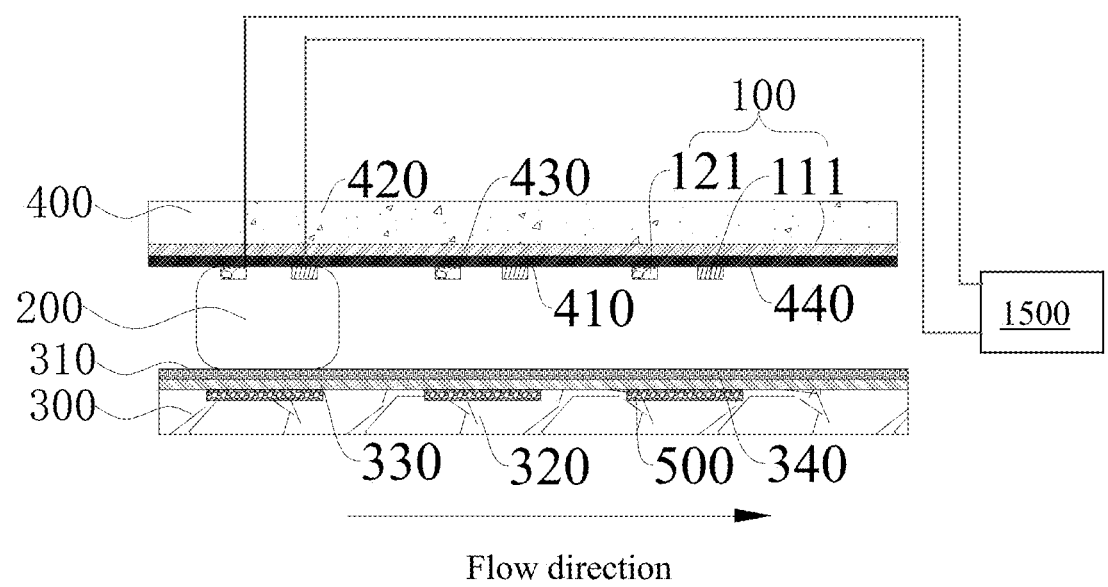
FIG. 15 is a cross-sectional view showing the structure of a microfluidic chip according to yet another embodiment of the present disclosure.

In some embodiments of the present disclosure, the probe electrode groups may be disposed entirely on the first surface of the first plate in contact with the microdroplet, as illustrated in FIG. 14. In some embodiments, the probe electrode groups can be disposed entirely on the second plate at the second surface in contact the microdroplet contact, as illustrated in FIG. 15. The specific configurations of the probe electrode groups can be similar to those of unipolar plate microfluidic chip described above.

In some embodiments of the present disclosure, referring to FIG. 13, the first probe electrode 111 in the probe electrode group may be disposed at the first surface 310 of the first plate 300 in contact with the microdroplet, and the second probe electrode 121 may be disposed at a second surface 410 of the second plate 400 in contact with the microdroplets. The specific structures and configurations of the first probe electrode 111 and the second probe electrode 121 can be similar to those described above.

According to some embodiments of the disclosure, the microfluidic chip further comprises: a controller 1500 coupled to the probe electrode group 100, and configured to determine, based on whether an electrical current flows through the probe electrode group 100, the location of the microdroplet 200. Therefore, automatic control can be realized, saving manpower and material resources, and improving detection accuracy and sensitivity.

According to some embodiments of the present disclosure, the connection between the controller and the first probe electrode 111 and the second probe electrode 121 is not particularly limited, and those of ordinary skill in the art can flexibly select the manners of coupling according to practical needs, so long as certain requirements are met. In some embodiments of the present disclosure, the controller and the first probe electrode 111 and the second probe electrode 121 may be connected by wires.

According to some embodiments of the present disclosure, the specific arrangement and positioning of the wires are not particularly limited, and those of ordinary skill in the art can flexibly select the configurations as needed, so long as certain requirements are met. In some embodiments of the present disclosure, a portion of the connecting wires between the first probe electrode 111 and the controller is disposed in a same layer as the first probe electrode 111, and a portion of the connecting wires between the second probe electrode 121 and the controller is disposed in the same layer as the second probe electrode 121. Therefore, the influence of the structure of the microfluidic chip on the real-time positioning result of the microdroplet 200 can be reduced, and the reliability is further increased.

According to some embodiments of the present disclosure, the specific types of the controller is not particularly limited, and those of ordinary skill in the art can flexibly select the controller according to practical needs. For example, a computer, an IC (Integrated Circuit), or the like can be configured as a controller to realize the functions described above.

Figure 16:
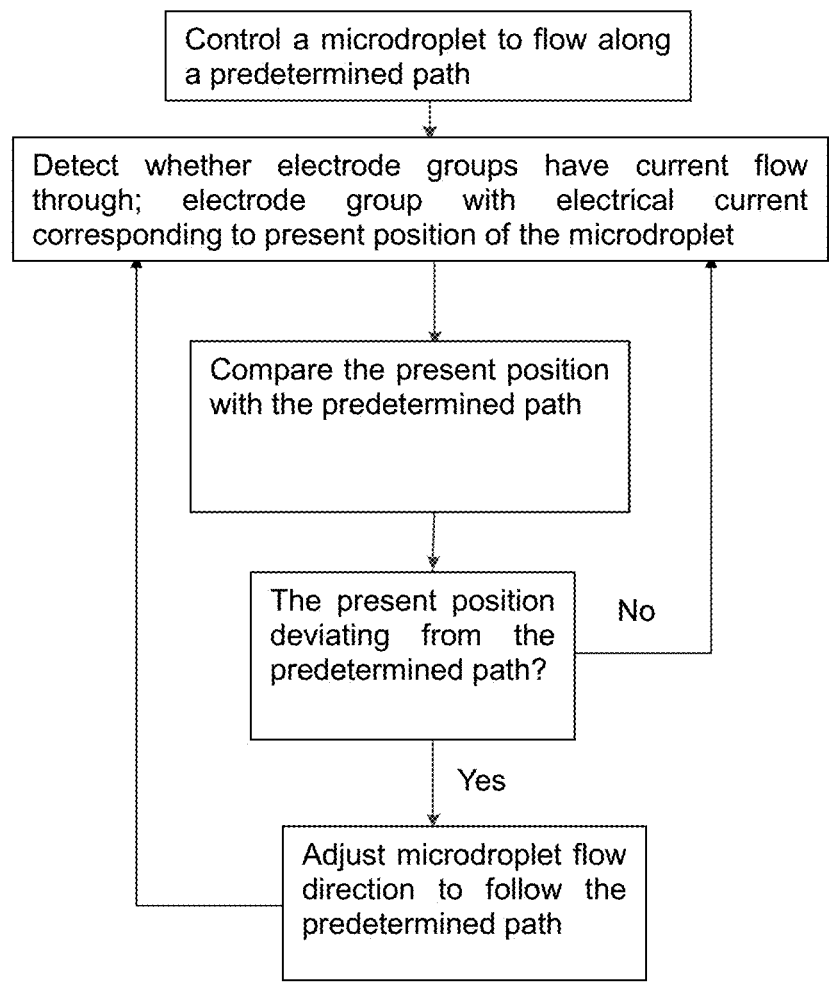
FIG. 16 is a flow chart showing a control method of a microfluidic chip according to an embodiment of the present disclosure.

In another aspect of the present disclosure, a method of controlling a microfluidic chip is provided. According to some embodiments of the present disclosure, referring to FIG. 1, the microfluidic chip includes: a plurality of probe electrode groups 100, where the plurality of probe electrode groups 100 are spaced apart along a flow direction of the microdroplets 200. Each of the probe electrode group 100 includes a first probe electrode 111 and a second probe electrode 121 spaced apart from each other, the first probe electrode 111 and the second probe electrode 121 are configured to form an electrically conductive loop with the microdroplet 200 to facilitate determining a position the microdroplet 200. According to some embodiments of the present disclosure, referring to FIG. 16, the control method includes: controlling the flow of the microdroplet 200 along a predetermined path; detecting whether the probe electrode group 100 has a current flowing therethrough, and a position corresponding to the probe electrode group 100 having the electrical current flowing therethrough is the present position of the microdroplet 200; comparing the present position with the predetermined path, and adjusting the microdroplet if the present position deviates from the predetermined path, to drive the flow direction of the microdroplet 200 such that the microdroplet 200 flows along the predetermined path.

Figure 17:
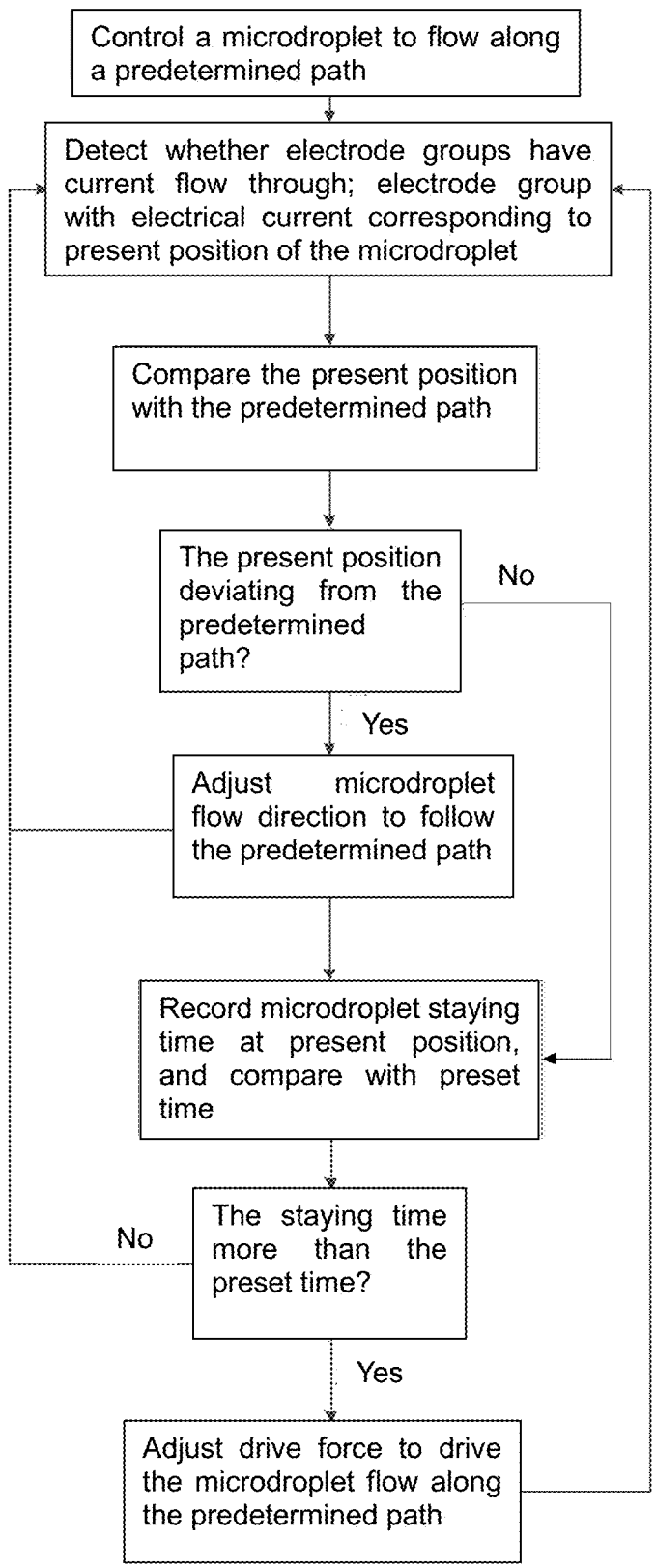
FIG. 17 is a flow chart showing a control method of a microfluidic chip according to another embodiment of the present disclosure.

According to some embodiments of the present disclosure, referring to FIG. 17, the control method further includes: recording a staying time of the microdroplet 200 at the present position, and comparing the staying time with a preset time. If the staying time exceeds a preset time, the driving force to the microdroplet 200 is adjusted such that the microdroplet 200 moves along the predetermined path. As such, when the flow of the microdroplets 200 is interrupted or blocked, the driving force of the microdroplets 200 can be adjusted such that the microdroplets 200 flow along a predetermined path, thereby ensuring that the entire operation is accurately performed.

Figure 18:
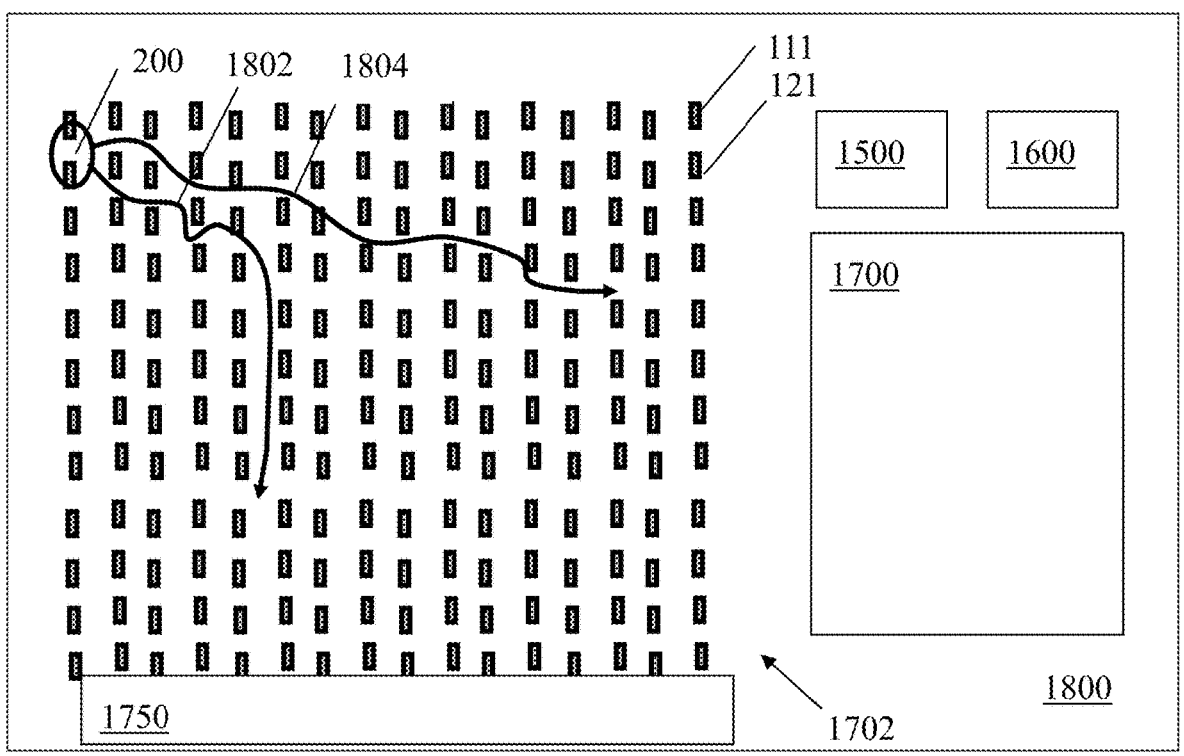
FIG. 18 is a schematic diagram illustrating a testing apparatus according to some embodiments of the present disclosure.

In yet another aspect, a testing apparatus is provided. According to some embodiments of the disclosure, referring to FIG. 18, the testing apparatus 1800 comprises one or more of the microfluidic chips 1702 described above. The testing apparatus 1800 can realize real-time positioning of the microdroplet 200 in the microfluidic chip 1702, has a low cost, and can facilitate integration and miniaturization.

Using electrical current as the feedback, as controlled by the controller 1500, interference from the environment and the biochemical reaction with the microdroplet 200 can be avoided. For example, using only the presence or absence of the electrical current as the basis for the presence or absence of the microdroplet 200, the amount of calculation data are reduced, and the reliability is improved.

In some embodiments, the testing apparatus can include a power supply 1600 to apply voltage to the probe electrodes and the drive electrodes. The voltage applied to the probe electrodes is rather low, such as less than 5 V, and does not affect the driving of the microdroplet 200.

According to some embodiments of the present disclosure, in addition to the microfluidic chip described above, the testing apparatus can further include other structures and components, such as a display device 1700, a sampling device 1750, a processing device, a detection device, a readout device, etc. The testing apparatus can be used, for example, gene sequencing, chemical analysis, precision microfluidic delivering, etc. Based on the specific applications, the sampling device 1750 can comprise, for example, a spectral analyzer, a chemical analyzer, etc.

At least some embodiments can have one or more of the following advantages. For example, the control method of the microfluidic chip is simple, convenient and easy to implement, and can realize real-time positioning of the microdroplet 200 in the microfluidic chip, and the cost is low. The configuration also facilitates integration and miniaturization. By using the electrical current as a feedback, interference from the environment and the biochemical reaction of the microdroplet 200 can be avoided or reduced.

Using only the presence or absence of the current as the basis of the presence or absence of the microdroplet 200, the amount of calculation data can be reduced, and the reliability can be improved. Because the applied voltage is low, the driving of the microdroplet 200 is not affected. When the microdroplet 200 deviates from the predetermined path, the flow direction of the microdroplet 200 can be adjusted such that the microdroplet 200 flows along the predetermined path, thereby ensuring that the entire testing operation is accurately performed. Only a very small amount of microdroplets is needed to realize sample testing, and the testing sequence can be digitally controlled. Using the drive electrodes 500, a pump is no longer needed as in a conventional microfluidic control. The positioning-feedback-adjusting control loop can facilitate a highly automated control of the microdroplets.

In a digital microfluidic control according to some embodiments of the disclosure, the drive electrodes 500 can be sequentially turned on, for example, using a sequence of thin-film transistors (TFTs) controlled through a scan line, automatic transport of microdroplets can be realized, for example with the electrowetting-on-dielectric (EWOD) effects, where the electrowetting properties of the surface 310 is modified with the applied electric field. By introducing the automatic positioning-feedback-adjusting control feedback loop according to some embodiments of the disclosure, high-level automation can be realized, for example to overcome the blockage of the microdroplets due to dust, surface roughness, etc. on the microfluidic chip. In contrast, a conventional microfluidic chip may rely on visual feedback control, resulting in higher cost in its equipment.

In some embodiments, the plurality of first and second probe electrodes 121, 122 can form an array on the microfluidic chip 1702. The plurality of probe electrode groups 100 therefore also can form one or more arrays. It should be noted that because the first and second probe electrodes 121, 122 can be exchangeable, based on the voltages applied thereon as controlled by the controller 1500. As such, one or more predetermined flow paths for one or more of the microdroplets 200 can be flexibly selected from the array.

For example, a first predetermined path 1802 can be selected, along which a microchannel may or may not be needed. A second predetermined path 1804 can also be selected, for example at the same time for different microdroplets. In some implementations, in a situation where the microdroplet 200 dwells at a probe electrode group longer than a preset time, the driving force of the microdroplet 200 can be adjusted, for example, increased by increasing a voltage on a corresponding drive electrode 500 providing the driving force to the microdroplet dwelling at the probe electrode group, such that the microdroplet 200 flows along the predetermined path 1802. Alternatively, if the driving force is insufficient for the microdroplet 200 to overcome the obstacle, such as dust or surface roughness, the controller 1500 can be configured to turn on different drive electrodes 500, such that a direction of the driving force on the microdroplet 200 is changed, to drive the microdroplet 200 flow through an alternate predetermined path 1804.

In some embodiments, the microfluidic chip 1702 or the array of the probe electrodes can be three dimensional. Accordingly, the predetermined paths 1802, 1804 can be 3-D paths. The 3-D array can be formed, for example, by stacking multiple 2-D microfluidic chips 1702, or integrally forming multiple layers of plates such as those illustrated in FIGS. 13-15, and having microchannels formed between layers or vertically across multiple layers.

In the description of the present disclosure, it is to be understood that the terms "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "perpendicular," "vertical," and other orientation or positional relationships are based on the orientation or positional relationship shown in the drawings, and are merely for the convenience of the description of some embodiments the disclosure, rather than indicating or implying the device or component referred to must having been constructed and operated in a particular orientation, and thus are not to be construed as limiting the disclosure.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, the first feature "on" or "below" in the second feature may be the direct contact of the first and second features, or the first and second features are indirectly through the intermediate medium, unless otherwise explicitly stated and defined. contact. Moreover, the first feature "above," "above" and "above" the second feature may be that the first feature is directly above or above the second feature, or merely that the first feature level is higher than the second feature. The first feature "below," "below" and "below" the second feature may be that the first feature is directly below or below the second feature, or merely that the first feature level is less than the second feature.

In the description of the present disclosure, the terms "one embodiment," "one implementation," "some embodiments," "some implementations," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

For example, the display device can display the predetermined path, along which the microdroplets flow. The display device can also display the drive force variations applied to the microdroplets, which compensate for surface roughness or dust on the microfluidic chip. The display device can further display the test and analysis results to the user.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Therefore, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

Although the embodiments of the present disclosure have been shown and described, it is understood that the above-described embodiments are illustrative and are not to be construed as limiting the scope of the disclosure. The embodiments are subject to variations, modifications, substitutions and variations. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A microfluidic chip configured to move a microdroplet along a predetermined path, comprising:
   a first plate having a first surface;
   a second plate having a first surface opposing the first surface of the first plate, wherein the first surface of the first plate is arranged so as to face the first surface of the second plate, the first and second plates each having an associated two-dimensional array of probe electrode groups provided on their respective first surfaces;
   wherein:
   each probe electrode group is paired with an associated opposing probe electrode group, and is spaced apart so as to define a predetermined path describing a desired path of a particular microdroplet;
   each of the plurality of probe electrode groups includes a first probe electrode and a second probe electrode spaced apart from each other;
   the first probe electrode and the second probe electrode among a plurality of first probe electrodes and a plurality of second probe electrodes are configured to form an electrical loop with the microdroplet to thereby facilitate determining a position of the microdroplet; and
   when a driving force is insufficient for the microdroplet to overcome an obstacle, the microfluidic chip is configured to turn on different drive electrodes such that a direction of the driving force on the microdroplet is changed, to thereby drive the microdroplet to flow through an alternate predetermined path;
   wherein at least one of the different drive electrodes and at least one of the plurality of first probe electrodes and the plurality of second probe electrodes have an overlapping projection.

2. The microfluidic chip according to claim 1, wherein two adjacent probe electrode groups among the plurality of probe electrode groups share one second probe electrode or one first probe electrodes; and the microfluidic chip is three dimensional such that the predetermined path is a 3-D path.

3. The microfluidic chip according to claim 1, wherein a distance between two adjacent probe electrodes groups is greater than a size of the microdroplet along the predetermined path to thereby facilitate accurately determining the position of the microdroplet.

4. The microfluidic chip of claim 1, wherein:
   the plurality of the first probe electrodes are electrically coupled to each other; or the plurality of the second probe electrodes are electrically coupled to each other.

5. The microfluidic chip according to claim 1, wherein the first probe electrode and the second probe electrode each have a thickness of 400 nm or less.

6. The microfluidic chip according to claim 1, wherein the plurality of probe electrode groups are disposed on the first surface of the first plate configured to be in contact with the microdroplet.

7. The microfluidic chip according to claim 6, wherein:
   the first plate comprises a plurality of drive electrodes spaced apart along the predetermined path; and
   each of the plurality of drive electrodes has an orthographic projection on the first surface covering an orthographic projection of at least one probe electrode group on the first surface.

8. The microfluidic chip according to claim 1, wherein:
   the first plate and/or the second plate comprise a plurality of drive electrodes spaced apart along the predetermined path;
   an orthographic projection of each of the plurality of drive electrodes on the first surface covers an orthographic projection of at least one probe electrode group on the first surface.

9. The microfluidic chip according to claim 7, wherein for each of the plurality of drive electrodes, an orthographic projection of at least one of the plurality of probe electrode groups on the drive electrode is located at a position biased toward a forward flow direction of the microdroplet from a center position of the drive electrode.

10. The microfluidic chip according to claim 1, further comprising a controller configured to perform an automatic positioning-feedback-adjusting control loop of the microdroplet.

11. The microfluidic chip according to claim 1, wherein at least one other of the plurality of probe electrode groups is configured to form an open circuit without contacting the microdroplet.

12. The microfluidic chip according to claim 1, wherein:
   the first probe electrodes and the second probe electrodes are composed of at least one of ITO (Indium-Tin Oxide), AZO (Aluminum-doped Zinc Oxide), or FTO (Fluorine-doped Tin Oxide), having a rectangular shape with a width of about 100 μm and a length of about 1 cm;

at least one of the first plate or the second plate comprises a substrate composed of glass, a dielectric layer composed of at least one of $SiO_2$, Perylene, or $Ta_2O_5$ and disposed over a surface of the substrate, and a hydrophobic layer disposed over the dielectric layer at a surface distal from the substrate;

the plurality of probe electrode groups are disposed at a surface of the hydrophobic layer distal from the substrate; and the first probe electrode and the second probe electrode in each of the plurality of probe electrode groups are arranged along the predetermined path, or spaced in a direction perpendicular to the predetermined path.

13. The microfluidic chip according to claim 1, wherein:
the plurality of probe electrode groups form an array; and
the predetermined path is determined by selecting probe electrode groups from the array.

14. The microfluidic chip according to claim 13, wherein the array is three dimensional.

15. A testing apparatus comprising:
the microfluidic chip according to claim 1; and
a power supply configured to supply a voltage between the first probe electrode and the second probe electrode of less than or equal to 5 V.

16. The testing apparatus of claim 15, further comprising a sampling device configured to analyze the microdroplet that flows along the predetermined path in a forward flow direction.

17. A method of controlling the microfluidic chip according to claim 1, the method comprising:
controlling the microdroplet to flow in a flow direction;
detecting whether one of the plurality of probe electrode groups has an electrical current flowing therethrough;
determining a position corresponding to the probe electrode group having the electrical current flowing therethrough as a present position of the microdroplet;
comparing the present position with the predetermined path; and
upon the present position deviating from the predetermined path, adjusting the flow direction of the microdroplet such that the microdroplet flows along the predetermined path.

18. The method according to claim 17, further comprising:
recording a stay time of the microdroplet at the present position;
comparing the stay time with a preset time; and
upon the stay time exceeding the preset time, adjusting the driving force for the microdroplet, such that the microdroplet flows along the predetermined path.

19. The method according to claim 17, further comprising:
recording a stay time of the microdroplet at the present position;
comparing the stay time with a preset time; and
upon the stay time exceeding the preset time, adjusting the driving force for the microdroplet, such that the microdroplet flows along the alternate predetermined path.

* * * * *